United States Patent
Salter et al.

(10) Patent No.: US 11,898,382 B2
(45) Date of Patent: Feb. 13, 2024

(54) VEHICLE HAVING POWERED DOOR CONTROL

(71) Applicant: Ford Global Technologies, LLC, Dearborn, MI (US)

(72) Inventors: Stuart C. Salter, White Lake, MI (US); Kristopher Karl Brown, Dearborn, MI (US); John Robert Van Wiemeersch, Novi, MI (US); Hussein H. Berry, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 331 days.

(21) Appl. No.: 17/469,972

(22) Filed: Sep. 9, 2021

(65) Prior Publication Data

US 2023/0077123 A1     Mar. 9, 2023

(51) Int. Cl.
| | |
|---|---|
| *E05B 81/20* | (2014.01) |
| *B60R 25/01* | (2013.01) |
| *B60R 25/31* | (2013.01) |
| *B60R 25/24* | (2013.01) |
| *G06T 7/70* | (2017.01) |
| *G06V 20/56* | (2022.01) |
| *G06V 40/10* | (2022.01) |

(52) U.S. Cl.
CPC .............. *E05B 81/20* (2013.01); *B60R 25/01* (2013.01); *B60R 25/241* (2013.01); *B60R 25/31* (2013.01); *G06T 7/70* (2017.01); *G06V 20/56* (2022.01); *G06V 40/10* (2022.01); *E05Y 2201/422* (2013.01); *G06T 2207/30196* (2013.01); *G06T 2207/30252* (2013.01)

(58) Field of Classification Search
None
See application file for complete search history.

(56) References Cited

U.S. PATENT DOCUMENTS

| | | | | |
|---|---|---|---|---|
| 6,498,970 | B2 * | 12/2002 | Colmenarez | G06F 18/256 |
| | | | | 382/116 |
| 9,834,974 | B2 * | 12/2017 | Elie | E05F 15/614 |
| 9,840,866 | B2 * | 12/2017 | Goto | B60J 5/04 |
| 10,190,357 | B2 * | 1/2019 | Kothari | E05F 15/40 |
| 10,443,291 | B2 * | 10/2019 | Kim | E05F 15/70 |
| 10,626,657 | B2 * | 4/2020 | Elie | E05F 15/614 |

(Continued)

FOREIGN PATENT DOCUMENTS

| | | |
|---|---|---|
| CA | 2312686 A1 * | 12/2000 |
| CN | 110588546 A * | 12/2019 |

(Continued)

*Primary Examiner* — Kevin R Steckbauer
(74) *Attorney, Agent, or Firm* — Frank Lollo; Price Heneveld LLP

(57) ABSTRACT

A vehicle having powered door access is provided including a powered door having an actuator for moving the door between closed and open positions, at least one sensor for sensing a first user approaching the vehicle, and a transceiver for communicating with another vehicle. The vehicle also includes a controller determining a distance of the first user from the vehicle and communicating with the other vehicle which determines a second user from the other vehicle, wherein the controller prioritizes which of the vehicle and the other vehicle is granted permission to open a door based on the distances of the first user and the second user.

20 Claims, 9 Drawing Sheets

(56) References Cited

U.S. PATENT DOCUMENTS

| | | | |
|---|---|---|---|
| 10,717,432 B2* | 7/2020 | Krekel | G06V 20/586 |
| 10,995,535 B2* | 5/2021 | Elie | B60J 5/047 |
| 11,624,229 B2* | 4/2023 | Morosawa | E05B 81/78 |
| | | | 49/31 |
| 2015/0284984 A1* | 10/2015 | Kanter | B60R 25/24 |
| | | | 49/31 |
| 2017/0030126 A1* | 2/2017 | Elie | E05B 81/14 |
| 2017/0328099 A1* | 11/2017 | Suzuki | E05B 81/20 |
| 2018/0066466 A1* | 3/2018 | Elie | E05F 15/70 |
| 2018/0245390 A1* | 8/2018 | Elie | E05F 15/70 |
| 2020/0040638 A1* | 2/2020 | Ohashi | E05B 83/18 |
| 2021/0180390 A1* | 6/2021 | Tokudome | E05F 15/73 |
| 2021/0214990 A1* | 7/2021 | Morosawa | E05B 81/16 |
| 2021/0222474 A1* | 7/2021 | Elie | E05F 15/70 |
| 2022/0017043 A1* | 1/2022 | Breynaert | B60R 25/01 |
| 2022/0025683 A1* | 1/2022 | Becher | E05B 81/77 |
| 2022/0205308 A1* | 6/2022 | Castonguay | E05B 81/78 |
| 2023/0034544 A1* | 2/2023 | Mozola | E05B 81/20 |
| 2023/0077123 A1* | 3/2023 | Salter | G06V 20/56 |

FOREIGN PATENT DOCUMENTS

| | | | | | |
|---|---|---|---|---|---|
| CN | 111137246 | A | * | 5/2020 | |
| CN | 107921849 | B | * | 3/2021 | B60J 5/04 |
| CN | 111137246 | B | * | 3/2021 | |
| CN | 113445848 | A | * | 9/2021 | |
| CN | 114008289 | A | * | 2/2022 | B60J 5/101 |
| CN | 114402372 | A | * | 4/2022 | B60R 25/01 |
| CN | 110588546 | B | * | 11/2022 | |
| CN | 217841191 | U | * | 11/2022 | |
| CN | 115492489 | A | * | 12/2022 | |
| CN | 115788222 | A | * | 3/2023 | |
| CN | 114008289 | B | * | 7/2023 | B60J 5/101 |
| DE | 102008012031 | A1 | * | 9/2009 | |
| DE | 102015107609 | A1 | * | 11/2015 | |
| DE | 102019107645 | A1 | * | 9/2019 | E05B 77/34 |
| DE | 102019118351 | A1 | * | 1/2021 | |
| DE | 212019000485 | U1 | * | 1/2022 | |
| DE | 212019000488 | U1 | * | 1/2022 | |
| DE | 102015107609 | B4 | * | 11/2022 | |
| DE | 102022113485 | A1 | * | 12/2022 | |
| DE | 102022118002 | A1 | * | 2/2023 | |
| DE | 102022122087 | A1 | * | 3/2023 | |
| FR | 2916467 | A1 | * | 11/2008 | |
| JP | 2007162345 | A | * | 6/2007 | |
| JP | 4958433 | B2 | * | 6/2012 | |
| JP | 2020112025 | A | * | 7/2020 | B60J 5/04 |
| JP | 6915213 | B2 | * | 8/2021 | |
| JP | 2021110199 | A | * | 8/2021 | |
| JP | 6985444 | B2 | * | 12/2021 | B60J 5/04 |
| JP | 2022024125 | A | * | 2/2022 | |
| JP | 7254150 | B2 | * | 4/2023 | |
| WO | WO-2020201803 | A1 | * | 10/2020 | |
| WO | WO-2020252601 | A1 | * | 12/2020 | |
| WO | WO-2021004570 | A1 | * | 1/2021 | |

* cited by examiner

VEHICLE HAVING POWERED DOOR CONTROL

FIELD OF THE DISCLOSURE

The present disclosure generally relates to control of vehicle powered doors, and more particularly relates to a system and method of controlling powered vehicle doors based on user location.

BACKGROUND OF THE DISCLOSURE

Motor vehicles are commonly equipped with various closure doors to allow ingress and egress of the vehicle passenger compartment as well as the trunk. The closure doors may be powered with electric motors which operate to open and close the doors. It would be desirable to provide for control of powered doors in a manner that takes into consideration the location of the user and users of other vehicles nearby.

SUMMARY OF THE DISCLOSURE

According to a first aspect of the present disclosure, a vehicle having powered door access is provided. The vehicle includes a powered door having an actuator for moving the door between closed and open positions, at least one sensor for sensing a first user approaching the vehicle, and a transceiver for communicating with another vehicle. The vehicle also includes a controller determining a distance of the first user from the vehicle and communicating with the other vehicle which determines a distance of a second user from the other vehicle, wherein the controller prioritizes which of the vehicle and the other vehicle is granted permission to open a door based on the distance of the first user and the distance of second user.

Embodiments of the first aspect of the disclosure can include any one or a combination of the following features:
- the controller controls the actuator to open the powered door when permission is granted;
- the at least one sensor comprises location determining circuitry communicating with an electronic device associated with the user;
- the electronic device comprises one of a phone and a key fob;
- the vehicle communicates with the other vehicle via the transceiver to acquire door opening data and requests;
- the at least one sensor comprises at least one imaging camera;
- the at least one imaging camera captures images of the first user proximate to the vehicle and the controller processes the images and determines if the first user is attempting to access the vehicle;
- the controller determines a location of the first user of the vehicle and actuates the powered door to the open position when the first user approaches the vehicle and is closer than the second user relative to the other vehicle;
- the controller determines a location of the first user and actuates the powered door to the open position when the first user is determined to approach the vehicle quicker than the second user of the other vehicle based on speed of the first and second users;
- the actuator comprises an electric motor;
- the at least one powered door comprises a passenger door that pivots about a hinge assembly; and
- the at least one door comprises a rear door.

According to a second aspect of the present disclosure, a vehicle having powered door access is provided. The vehicle includes a powered door having an actuator for moving the door between closed and open positions, at least one sensor for sensing a first user approaching the vehicle, and a transceiver for communicating with another vehicle. The vehicle also includes a controller determining a distance of the first user from the vehicle and communicating with the other vehicle which determine a distance of a second user from the other vehicle, wherein the controller prioritizes which of the vehicle and the other vehicle is granted permission to open a door based on the distance of the first user and the distance of the second user, and wherein the controller controls the actuator to open the powered door when permission is granted.

Embodiments of the second aspect of the disclosure can include any one or a combination of the following features:
- the at least one sensor comprises location determining circuitry communicating with an electronic device associated with the user;
- the at least one imaging camera captures images of the first user proximate to the vehicle and the controller processes the images and determines if the first user is attempting to access the vehicle;
- the controller determines a location of the first user of the vehicle and actuates the powered door to the open position when the first user approaches the vehicle and is closer than the second user relative to the other vehicle; and
- the controller determines a location of the first user and actuates the powered door to the open position when the first user is determined to approach the vehicle quicker than the second user of the other vehicle based on speed of the first and second users.

According to a third aspect of the present disclosure, a method of controlling powered doors on first and second vehicles is provided. The method includes the steps of communicating between a first vehicle having a first powered door and actuator for moving the first powered door between closed and open positions and a second vehicle having a second powered door having a second actuator for moving the second powered door between closed and open positions, sensing a first user approaching the first vehicle, sensing a second user approaching the second vehicle, determining a distance of the first user from the first vehicle, determining a distance of the second user from the second vehicle, and prioritizing which of the first and second doors of the respective first and second vehicles may open based on the distance of the first user and the distance of the second user.

Embodiments of the third aspect of the disclosure can include any one or a combination of the following features:
- controlling the first and second actuators to open one of the first and second powered doors when permission is granted; and
- determining when the first user is approaching the first vehicle quicker than the second user approaching the second vehicle based on speed of the first and second users, and opening the first door of the first vehicle.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present disclosure are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

Figure 1:
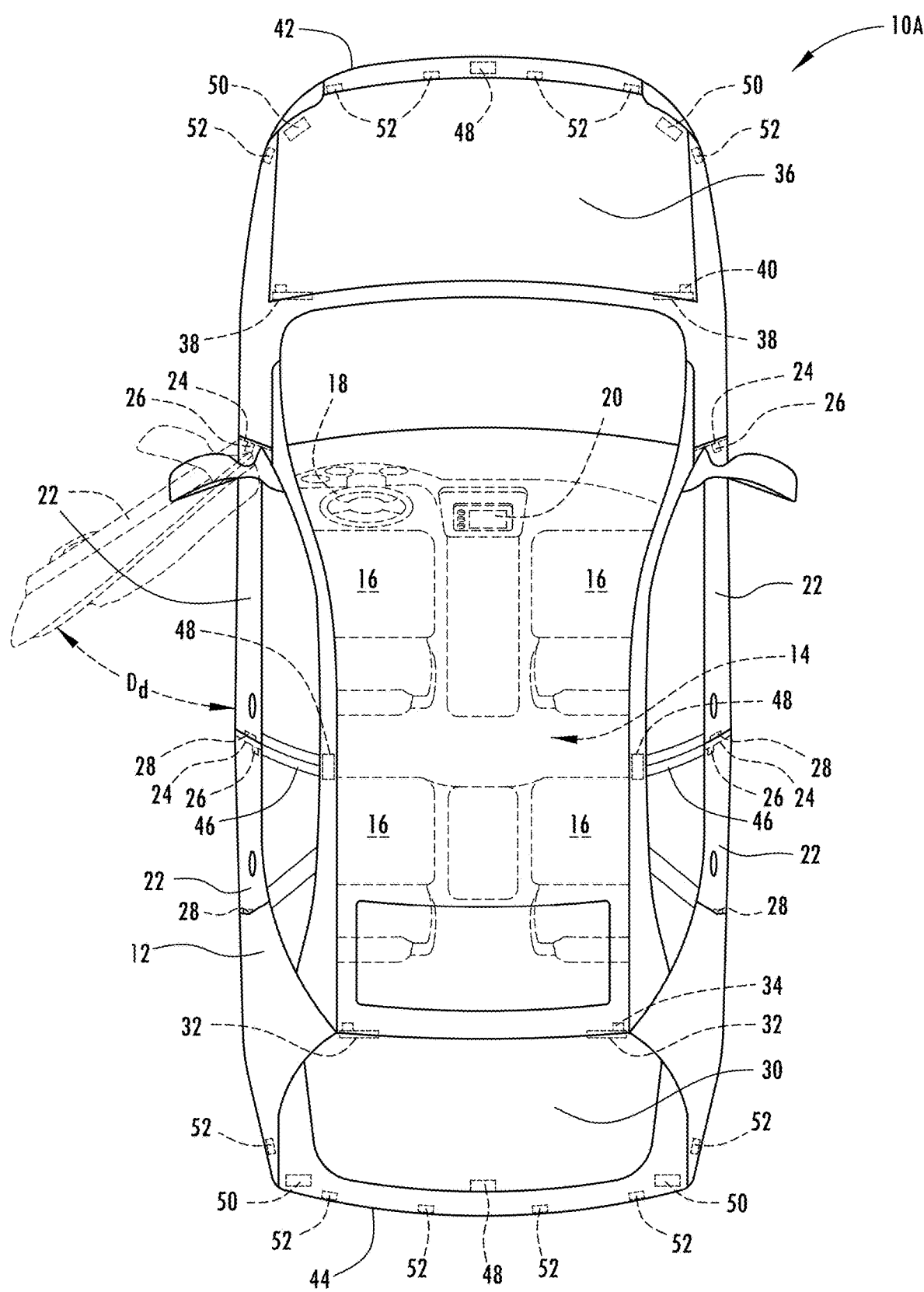
FIG. 1 is a top schematic view of a motor vehicle equipped with powered doors and sensors and controls for controlling the doors, according to one embodiment.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle having powered doors with door controls. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIG. 1, a wheeled automotive or motor vehicle 10A is generally illustrated having a cabin interior 14 defined by a vehicle body 12 and configured with passenger seating for transporting passengers in the vehicle 10A. The cabin interior 14 is generally defined by the vehicle body 12 and may include various features and trim components within the cabin interior 14. The cabin interior 14 may include an arrangement of passenger seats 16 including a first or front row of driver and passenger seats generally located towards the front of the cabin interior 14 and one or more rows of passenger seats located rearward of the front row of passenger seats. The vehicle 10A may be equipped with a steering wheel 18 located in front of the driver seat to enable the driver to steer the vehicle road wheels. Additionally, one or more human machine interfaces (HMI), such as a touchscreen display 20, audio speakers, microphone, etc., may be provided on the vehicle 10A to communicate with the driver and one or more passengers in the vehicle 10A.

The vehicle 10A is equipped with powered doors and user detection and controls to assist with operation of the doors of the vehicle 10A and allow the driver and passengers to enter the vehicle 10A. The vehicle 10A has a plurality of powered closure doors that include four side passenger doors 22, with two doors on each opposite lateral side of the vehicle 10A. In addition, the vehicle 10A has a powered rear trunk door 30 such as a powered liftgate or tailgate at the rear of the vehicle 10A and a powered front trunk door 36 at the front of the vehicle 10A. Each of the powered doors 22, 30 and 36 may close a space such as a space of the cabin interior 14 in the closed position and allow access to the cabin interior 14 in an open position. The powered doors 22, 30 and 36 are power-operated doors, each having an actuator, such as an electric motor, for moving the corresponding door between the closed and open door positions. The actuators may move the powered doors between the open and closed door positions in response to detecting a user approaching the vehicle 10A and attempting to enter the vehicle 10A or a user input, such as an input entered on a vehicle mounted switch panel, a key fob, a smartphone or other electronic device. The powered doors may be opened and closed by the actuators in response to detecting movement or position of a driver or potential passenger approaching or departing the vehicle 10A. Additionally, the powered doors may be controlled to open partway or at different speeds.

It should be appreciated that the vehicle 10A may include additional rows of seating and powered doors, such as may be found on large SUVs, vans and buses. For example, the vehicle 10A may include two side doors or more than four side doors. The vehicle 10A may be a motor vehicle, such as a wheeled car, truck, SUV, van or bus, for example, having one or more powered doors. Each of the powered doors moves relative to the body 12 of the vehicle 10A between a closed door position and an extended open door position and therefore requires space to move between the closed and open door positions. The vehicle controls advantageously assist with operation of the powered doors and/or the vehicle 10A in a manner to reduce the likelihood of interference with one or more obstacles such as one or more open doors on another vehicle that may contact the powered doors on the vehicle 10A as the corresponding doors attempt to move between the open and closed door positions.

The vehicle 10A is shown in FIG. 1 having four side powered doors 22, with two of the side doors 22 located forward and adjacent to the front row of seats 16 and the other two of the side doors 22 located rearward thereof and adjacent to the second or rear row of seats 16. Each of the side doors 22 may include a door panel and window that pivots about hinges 24 generally along a vertical axis to allow the door 22 to swing outward through a swing path to an open door position or inward to a flush position with the body 12 of the vehicle 10A where it may be latched via latch 28 in the closed door position. The side doors 22 each includes an actuator such as an electric motor 26 which may be located at or near one of the hinges 24 to power actuate the powered door 22 between the closed and open door positions.

The vehicle 10A has a rear trunk 30 and a front trunk 36, each of which pivots between a closed position and an open position. The rear trunk 30 pivots about a pair of horizontal hinges 32 and is actuated by an actuator, such as an electric motor 34. The front trunk 36 likewise has a pair of horizontal hinges 38 and is actuated by an actuator, such as an electric motor 40.

The vehicle 10A is equipped with a plurality of sensors that are located and oriented on the vehicle 10A for sensing objects such as potential users, e.g., driver and passengers expected to enter the vehicle 10A or passing by the vehicle 10A and obstacles outside of the vehicle 10A and within a space surrounding the vehicle 10A. The plurality of sensors generate signals indicative of the sensed objects. The plurality of sensors may include a plurality of imaging devices, such as two side view cameras 48, which are shown located on opposite lateral sides of the vehicle 10A shown at or near the B-pillars 46, a front view camera 48 shown in a front fascia 42 of the vehicle 10A and a rear view camera 48 shown in a rear fascia 44 of the vehicle 10A. Each of the cameras 48 may acquire images of the space around the perimeter of the vehicle 10A, particularly covering the swing path of the powered doors. The acquired images may be processed by video processing to identify the objects such as one or more people and the position of the objects relative to the vehicle 10A.

The plurality of sensors may also include radar sensors 50 shown located at each of the four corners of the vehicle 10A for sensing objects located outside of the vehicle and within the space surrounding the vehicle 10A. The radar sensors 50 transmit radio waves and process their reflections from objects to determine distance to the object and location of the object. Further, the plurality of sensors may include a plurality of ultrasonic sensors 52 shown located at various locations along the front portion and rear portions of the vehicle 10A. In the examples shown, six ultrasonic sensors 52 are shown spaced apart and located at or proximate to the rear fascia 44 and six ultrasonic sensors 52 are shown spaced apart and located at or proximate to the front fascia 42. As such, the radar and ultrasonic sensors 50 and 52 may detect the location, size and relative distance from the vehicle 10A to the detected objects. It should be appreciated that other sensors may be employed by the vehicle 10A to sense objects relative to the vehicle 10A, including objects within the swing path of the powered doors, and generate sensed signals that may be used to identify each object and the distance and location of the sensed object relative to the vehicle 10A for use in assisting with the operation of the vehicle 10A and the powered doors of the vehicle 10A.

Figure 2:
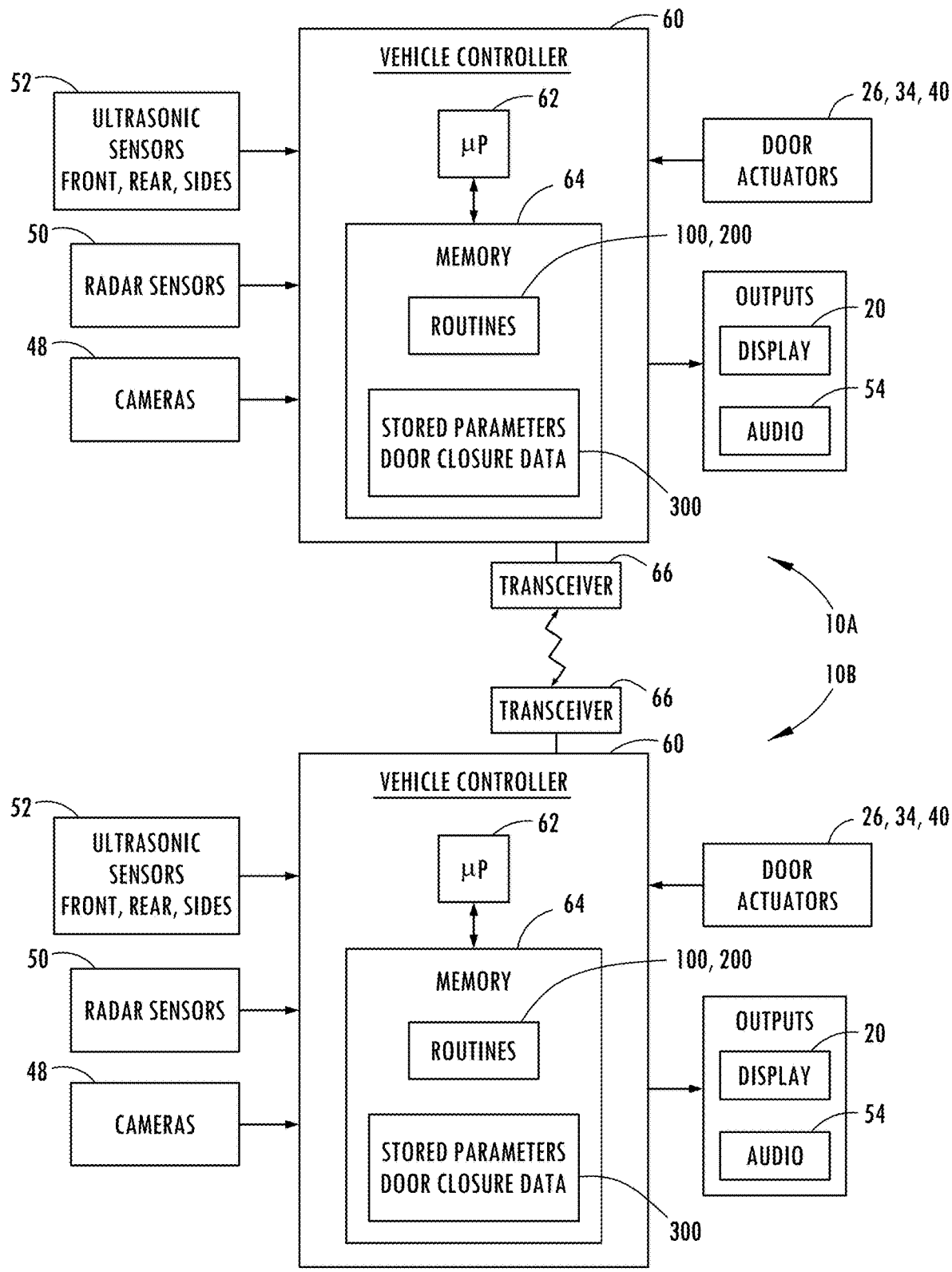
FIG. 2 is a block diagram of two vehicles each having a controller configured to provide and control the powered doors.

Referring to FIG. 2, the vehicle 10A, also referred to as the first vehicle, is shown along with another vehicle 10B, also referred to as a second vehicle. The other vehicle 10B is configured similar to vehicle 10A shown in FIG. 1. Both vehicles 10A and 10B each have a vehicle controller 60 that detects a user, such as a driver, attempting to enter the vehicle and controls one or more powered doors. The vehicle controller 60 in each vehicle may include control circuitry, such as a microprocessor 62 and memory 64. It should be appreciated that the vehicle controller 60 may be comprised of analog and/or digital control circuitry. Stored in memory 64 are one or more routines including routines 100 and 200 which may be executed by the microprocessor 62. In addition, various stored parameters and door closure data 300 may be stored in memory 64 and processed by the microprocessor 62. The stored parameters 400 may include powered door data 90 including dimensions for each powered door on the corresponding vehicle, including the distance extended outward from the vehicle body 12 and throughout the door swing path as the door moves between the closed and open door positions. The vehicle controller 60 receives inputs from the plurality of sensors located on the vehicle 10A including the cameras 48, radar sensors 50 and ultrasonic sensors 52. In addition, the vehicle controller 60 generates one or more outputs which may serve as countermeasures and provides the outputs to one or more HMIs such as the touchscreen display 20 and audio speakers 54 located on the vehicle 10A and to the door motors 26. The one or more outputs may serve to activate an actuator to open or close a powered door.

The controller 60 provides outputs to each of the electric motors 26 associated with the side powered doors 22. As such, the controller 60 may control actuation of the side powered doors 22 between the open and closed door positions. In the event that a user such as the driver is approaching the first vehicle 10A, the driver door may be actuated by the motor 26 to the open position based on a user input or detected intention of the user entering the first vehicle 10A. The vehicle 10A may further communicate with the second vehicle 10B and potential users of that second vehicle 10B and generate a prioritization as to who is granted access to open a door to enter which vehicle first based on the distance or who is approaching and expected to reach their vehicle first. In the event that a second user of an adjacent second vehicle 10B is approaching the second vehicle 10B before the first user reaches the first vehicle 10A, the door of the first vehicle 10A may remain closed until the user of the second vehicle 10B has entered the second vehicle 10B and the door is closed. Further, if a passerby e.g., pedestrian, is passing by a vehicle, the vehicle may not open until the passerby has passed by the vehicle door. Similarly, the other doors of the first and second vehicles 10A and 10B, such as the trunk 30 and frunk 36 may likewise be controlled based on a user input or identifying a user intending to access the corresponding door. In the event that one of the trunk or frunk of the first vehicle 10A parked adjacent to and close proximity to a trunk or frunk of adjacent door of the second vehicle 10B, the first vehicle 10A may communicate with the second vehicle 10B and determine a prioritization as to which user approaches their vehicle first and may open the door of that vehicle while holding the door of the other vehicle until the user of the door of the accessed vehicle is closed. The user of a vehicle whose door is held may be notified via a human machine interface (HMI).

The vehicle controller 60 of both vehicles may further communicate data via a transceivers 66 to provide vehicle-to-vehicle communication. The vehicle-to-vehicle communication may use DSRC, V2V, BLE, UWB, UHF, LiFi, or WiFi, for example, and may include sharing locations of users relative to the corresponding vehicle or vehicles and the prioritization as to which user will approach their vehicle first and which door will open first. Additionally, the transceiver 66 of one vehicle may acquire data from the other vehicle such as the stored parameters and door closure data to determine whether or not there is a likelihood that the opening of one door of one vehicle may contact a door of the other vehicle if opened at the same time. Transceiver 66 of first vehicle 10A may communicate with users and other vehicles such as second vehicle 10B.

Figure 3:
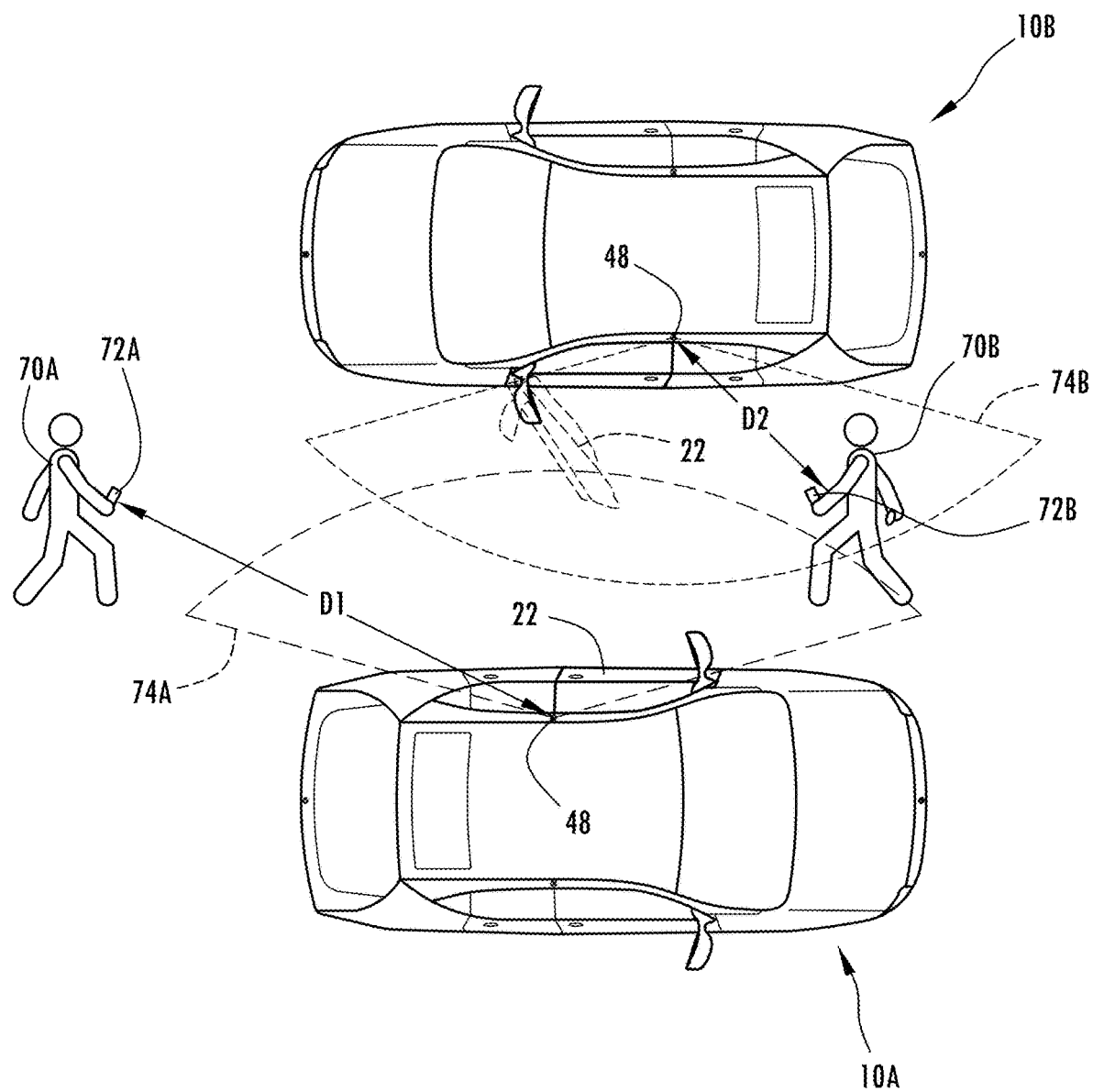
FIG. 3 is a schematic view of two motor vehicles each having powered doors with users approaching the vehicles, according to one example.

Referring to FIG. 3, first and second motor vehicles 10A and 10B are shown parked side-by-side and each having powered doors 22 and respective first and second users 70A and 70B approaching the respective vehicles, according to one example. The first user 70A, such as a driver of first vehicle 10A, is shown approaching the first vehicle 10A at a first distance D1. The second vehicle 10B is parked side-by-side with the first vehicle 10A such that the potential for two open doors 22 to contact each other is present. The second user 70B is shown approaching the second vehicle 10B at a second distance D2. The first user 70A may possess an electronic device 72A, such as a key fob or smartphone, having communication circuitry, and capable of providing an input to request or command opening of the door of the first vehicle 10A. Similarly, the second user 70B may likewise have an electronic device 72B, such as a key fob or a smartphone, having circuitry to provide an input to command a door on the second vehicle 10B to open. Each of the first and second users 70A and 70B may input a command to the electronic device with a request to open the door via the motors or the intention of the first and second users 70A and 70B may be determined using multifactor activation which looks for the presence of a user approaching their vehicle and the intention of the user to enter their vehicle. The multifactor authentication may look at the position of the user relative to the vehicle, image recognition recognizing the face of the user looking or staring towards the door handle, recognizing the presence of a key fob or other recognizable electronic device associated with the vehicle or recognizing the facial characteristic of the user as a user of the vehicle, and monitoring the body position of the user, such as whether the user is facing the door handle indicative of a user attempting to access the vehicle.

Figure 4:
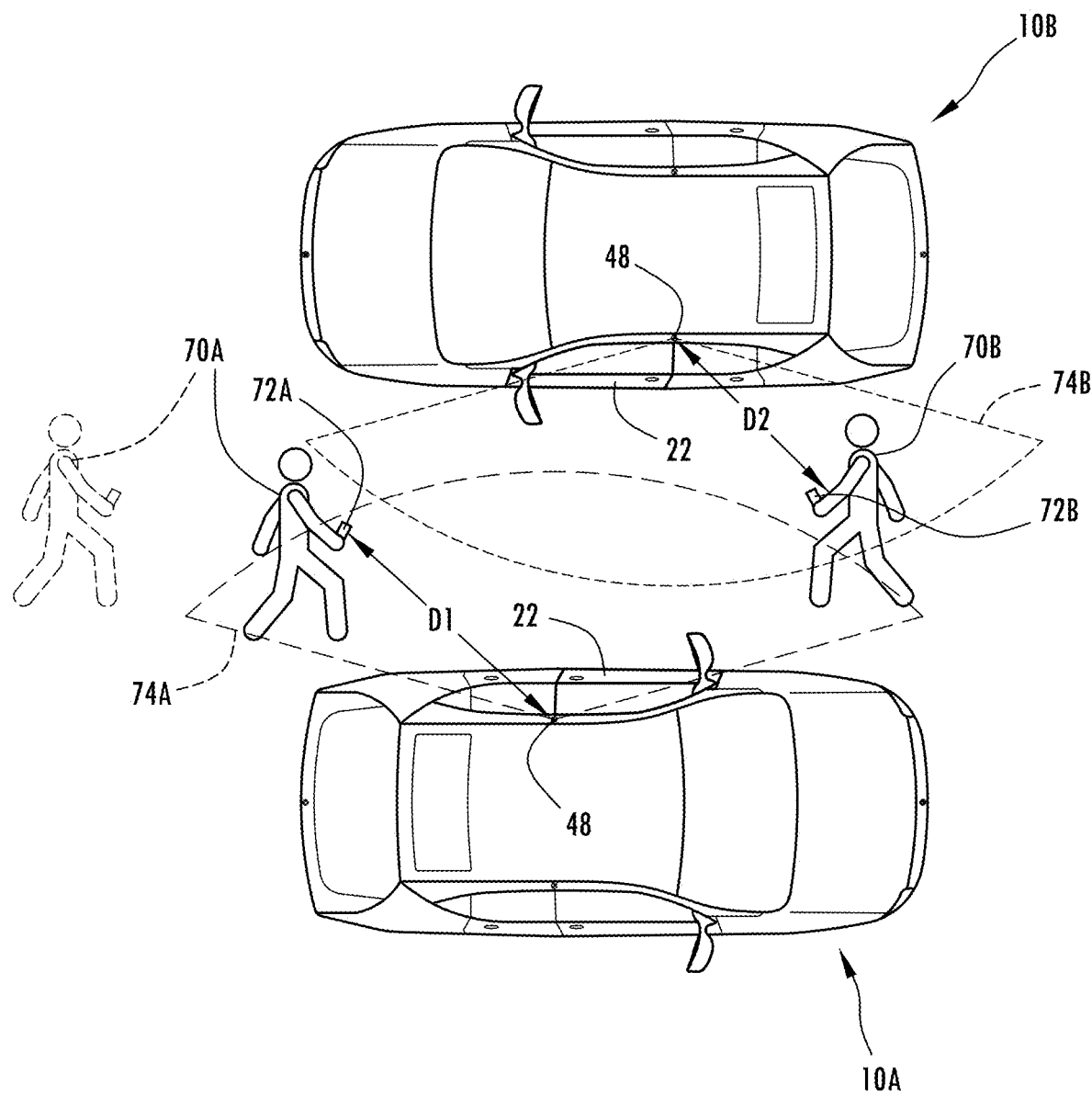
FIG. 4 is a schematic view of two motor vehicles each having powered doors with users approaching the vehicles, according to another example.

In the example shown in FIG. 3, the second user 70B at a second distance D2 from the second vehicle 10B is closer to the second vehicle 10B compared to the first distance D1 between the first user 70A and the first vehicle 10A. In this example, the driver door 22 of the second vehicle 10B will open first to allow the second user 70B to enter the second vehicle 10B. When this occurs, the driver door 22 of the first vehicle 10A remains closed until the door 22 of the second vehicle 10B is closed. In the event that the first user 70A is determined to be approaching first vehicle 10A as seen in FIG. 4 at a sufficiently greater speed such that the first user 70A would reach the first vehicle 10A prior to the second user 70B reaching the second vehicle 10B, then the first vehicle 10A is granted prioritization to open door 22 first. Once the door on the first vehicle 10A is closed, prioritization is granted for the door on the second vehicle 10B to open.

The facial characteristics of the first and second users 70A and 70B may be identified by using the cameras 48, such as side cameras which cover imaging zones 74A and 74B of vehicles 10A and 10B, respectively. In addition, other sensors, such as radar and ultrasonic sensors employed on each of the vehicles may be employed to detect an object and to determine the distance of the users from the corresponding vehicles 10A and 10B. It should further be appreciated that the distance between a user and a vehicle may otherwise be determined, such as via global position system (GPS) provided on the user's phone or by determining time-of-flight RF signal communication between an electronic device associated with the user and the vehicle or using triangulation between an electronic device associated with the user and a plurality of transceivers located on the corresponding vehicle or using RSSI, AoA or Phasing, for example.

Figure 5:
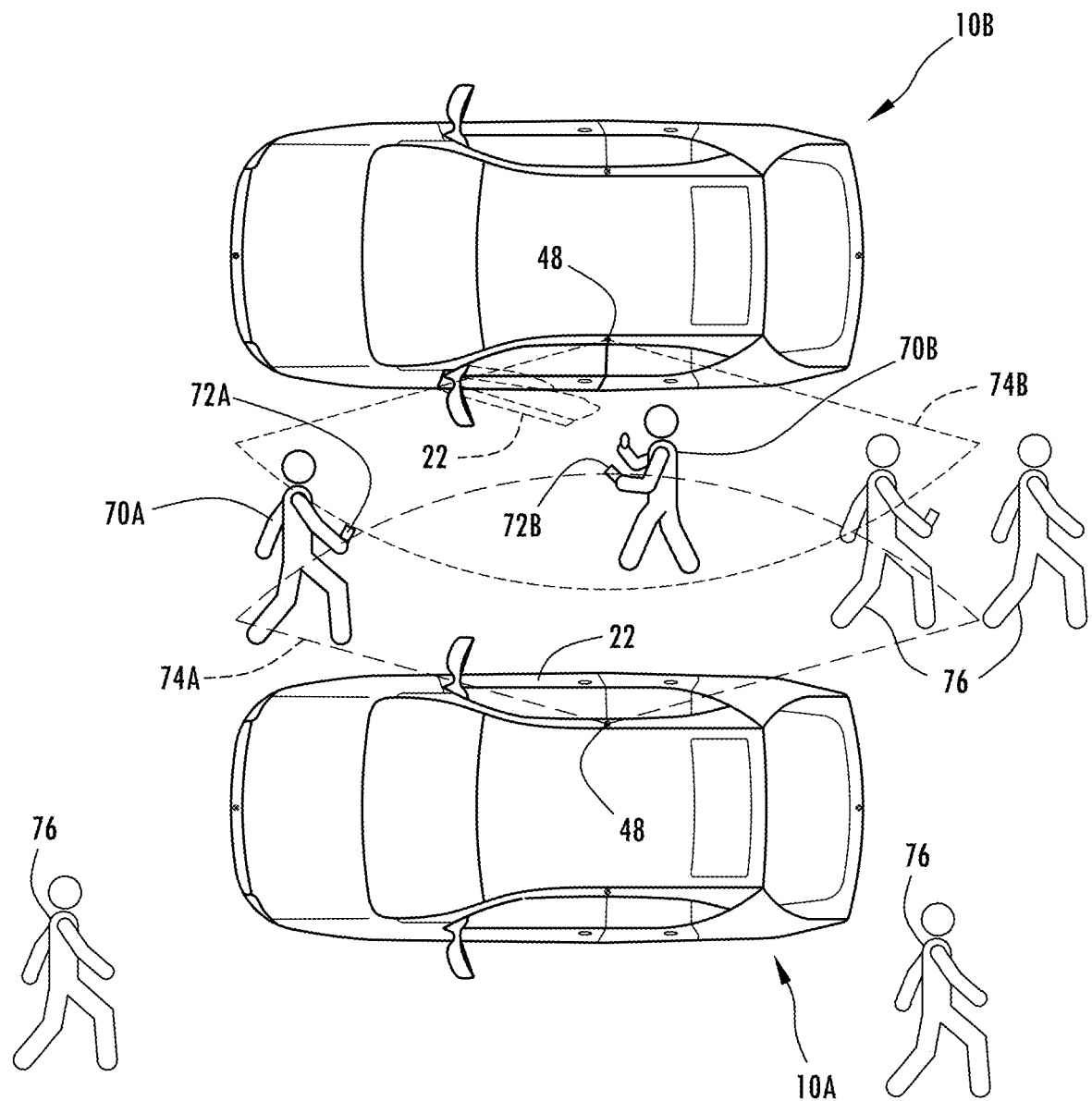
FIG. 5 is a schematic view of two motor vehicles each having powered doors with users and other pedestrians approaching the vehicles, according to a further example.
Figure 6:
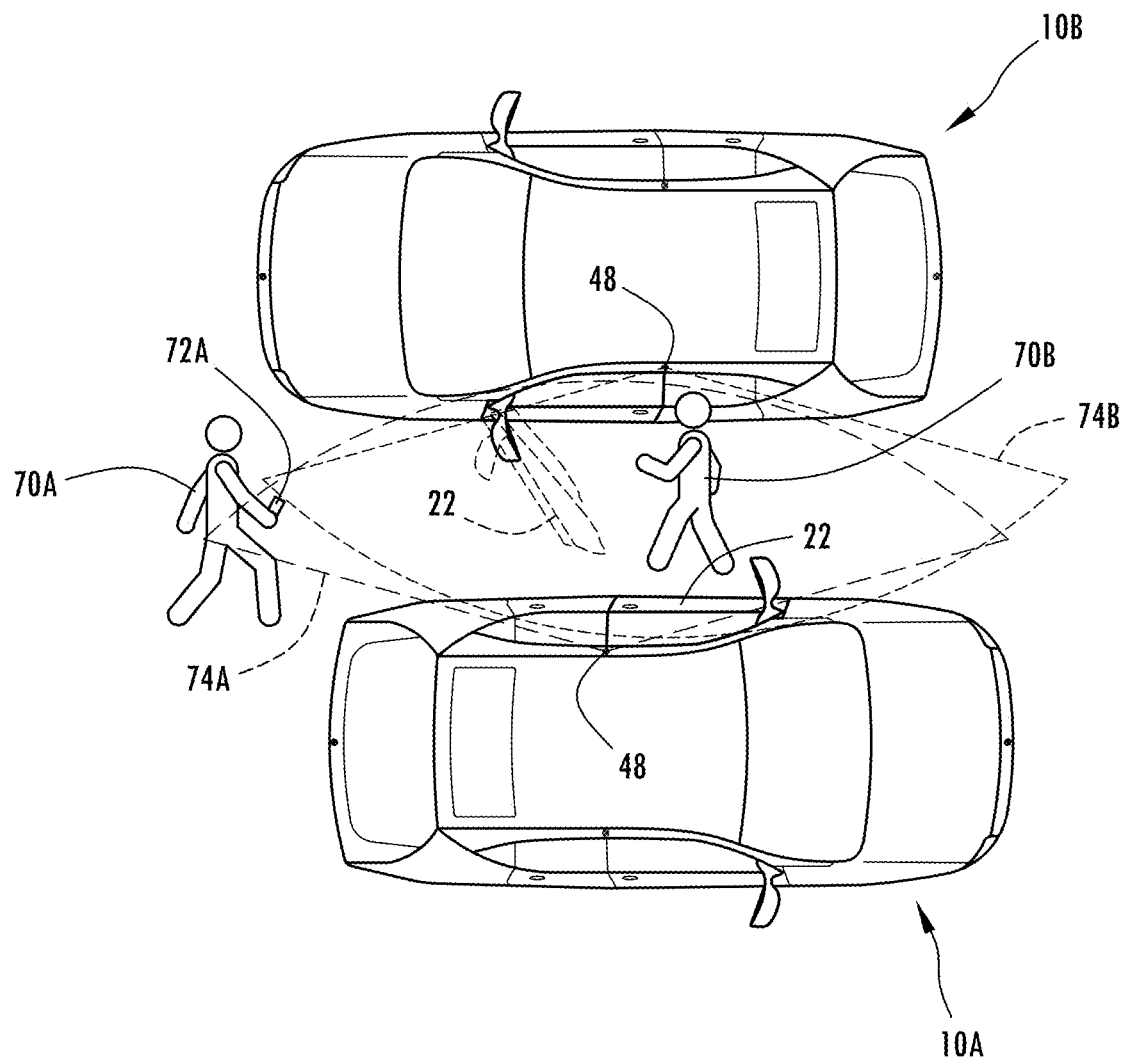
FIG. 6 is a schematic view of two motor vehicles each having powered doors with users approaching the vehicles, according to a further example.

Referring to FIG. 5, the first user 70A is shown approaching the first vehicle 10A and the second user 70B is shown approaching the second vehicle 10B while a number of passerbys 76, such as pedestrians, walk between the vehicles 10A and 10B and around the vehicle. The sensors, including the cameras 48 can identify the presence of passerbys 76 that are not affiliated with either first vehicle 10A or second vehicle 10B and can control the opening and closing of the doors on either vehicle to reduce the likelihood of interference by a passerby 76. For example, as the second user 70B approaches the second vehicle 10B, the driver door 22 may be opened partly to leave space for the passerby 76 to walk by without contacting the door. Once the passerby 76 has cleared the area proximate the door as shown in FIG. 6, the driver door 22 of the second vehicle 10B may be open to the full open position. If the passerby 76 does not clear the area within a time period, a message may be sent to the user to open the door manually. Once the door 22 on the second vehicle 10B has closed, the door 22 on the first vehicle 10A may open to allow the first user 10A to access the first vehicle 10A.

Figure 7:
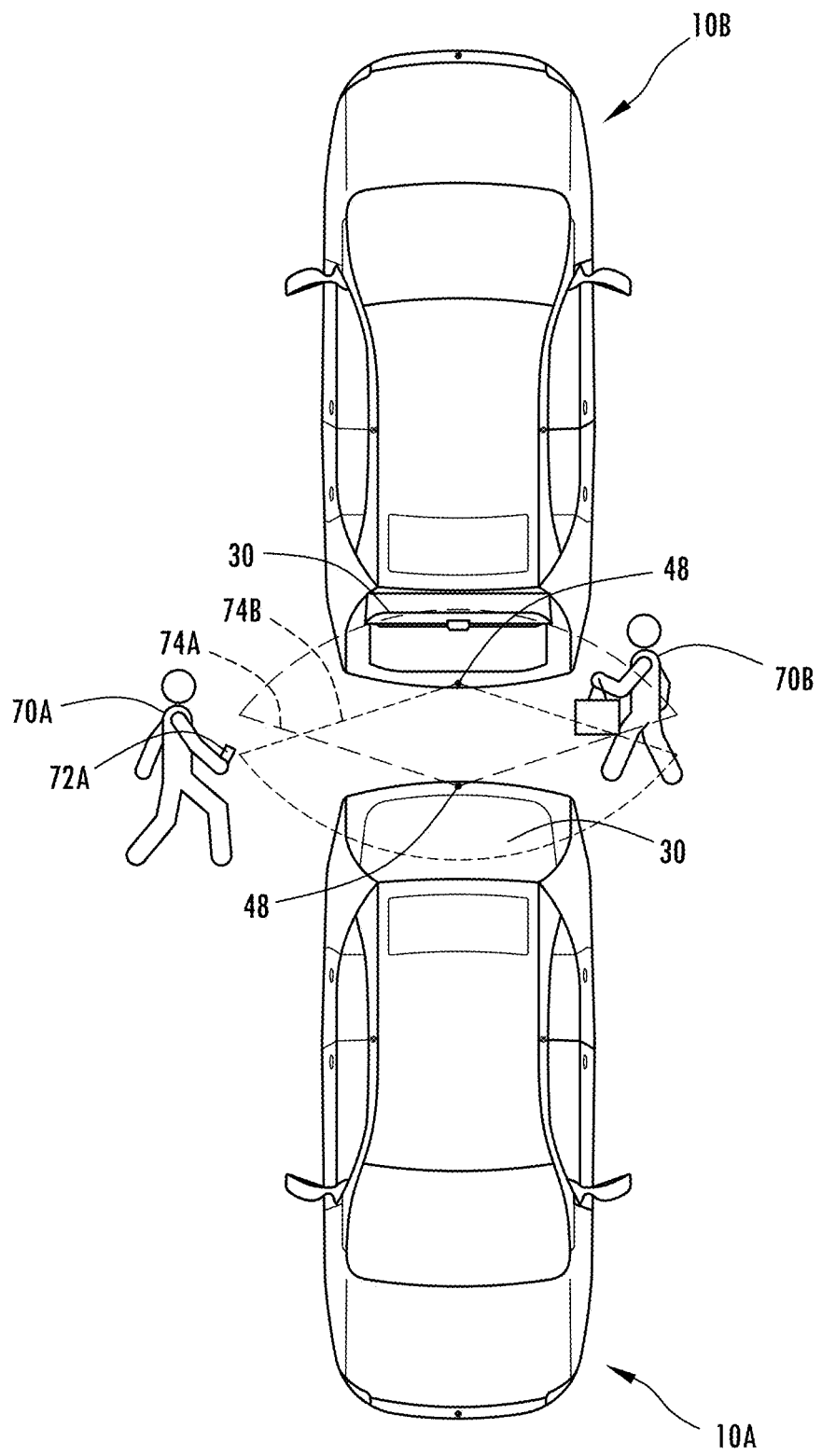
FIG. 7 is a schematic view of two motor vehicles each having powered rear doors with users approaching the vehicles, according to a further example.

Referring to FIG. 7, a parking scenario is shown in which the first vehicle 10A and the second vehicle 10B are parked with rear ends proximate one another such that access to both of the trunks 30 is limited. In this situation, the vehicles 10A and 10B may identify when the corresponding users 70A and 70B approach the corresponding vehicles and provide an input to open the trunk 30 or show an intention to open trunk similar to an intention to open a passenger door. In this scenario, the trunk doors 30 may be controlled to provide prioritization to the user that is closest to or approaches the corresponding vehicle first. Similar door controls may apply for two front doors or frunks proximate each other or a trunk and a frunk proximate one another.

Figure 8:
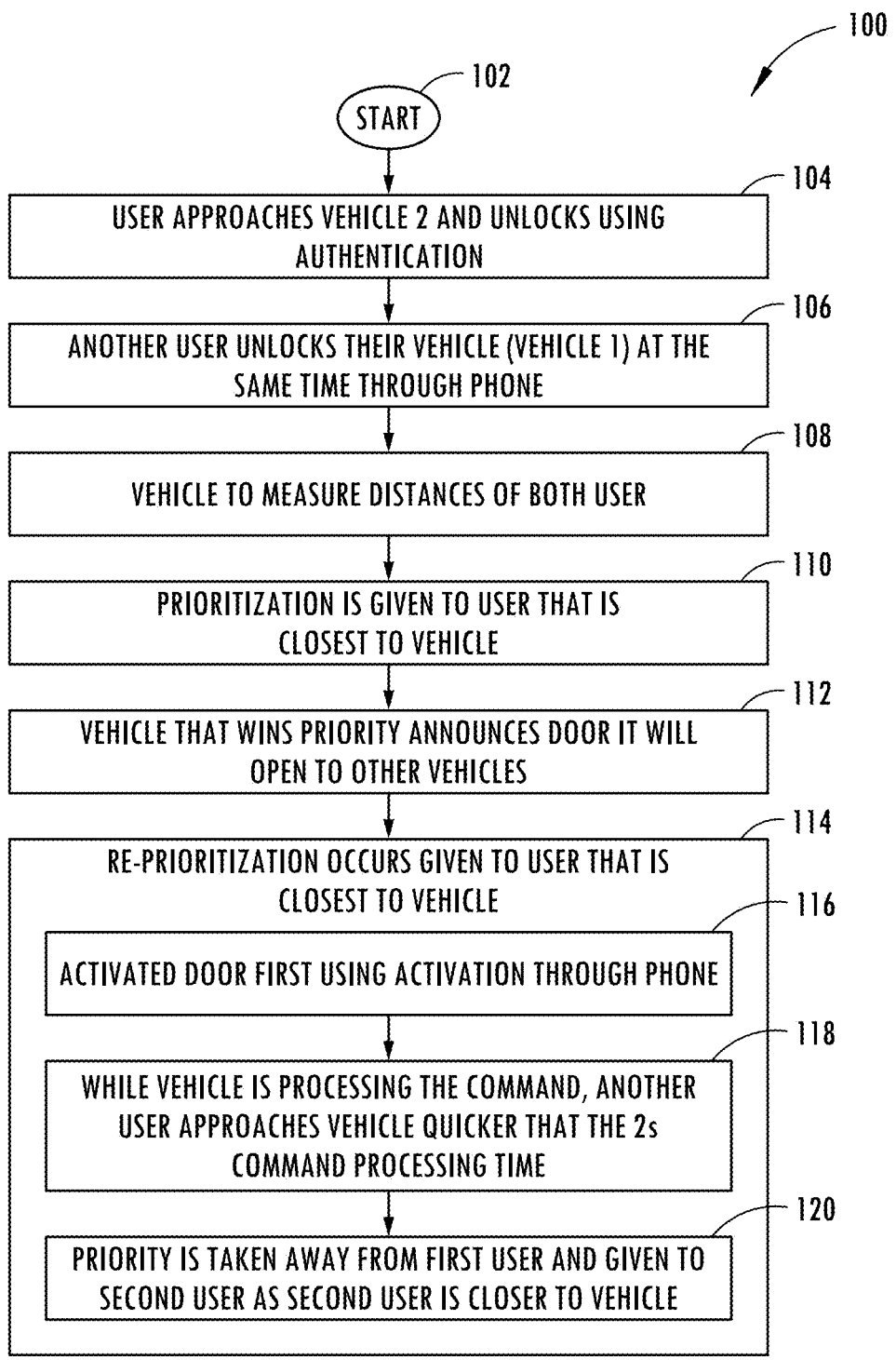
FIG. 8 is a flow diagram illustrating a routine for detecting users approaching the vehicles and controlling the vehicle doors, according to one example.

Referring to FIG. 8, routine 100 is illustrated, according to one example. In this example, routine 100 begins at step 102 and proceeds to step 104 in which a second user approaches the second vehicle 2 and unlocks the second vehicle using an authentication. Next, at step 106, another user unlocks the first vehicle 1 at the same time via an electronic device, such as a smartphone. Routine 100 then proceeds to step 108 to measure distances of both users from the respective vehicles. Routine 100 then gives prioritization to that user that is closest to the respective vehicle. At step 112, the vehicle that wins priority announces the door it will open and communicates to the other vehicle so that the other vehicle does not open the door at the same time. Routine 100 then proceeds to step 114 to provide priority to the user that is closest to their vehicle. This may include activating the door first using the activation through the electronic device, such as a phone in step 116. At step 118, when the vehicle is processing the command, another user may approach their vehicle quicker than a predetermined processing time such as two seconds in one example. When this occurs, priority is taken away from the first user and given to the second user as the second user becomes closer to their vehicle at step 120.

Figure 9:
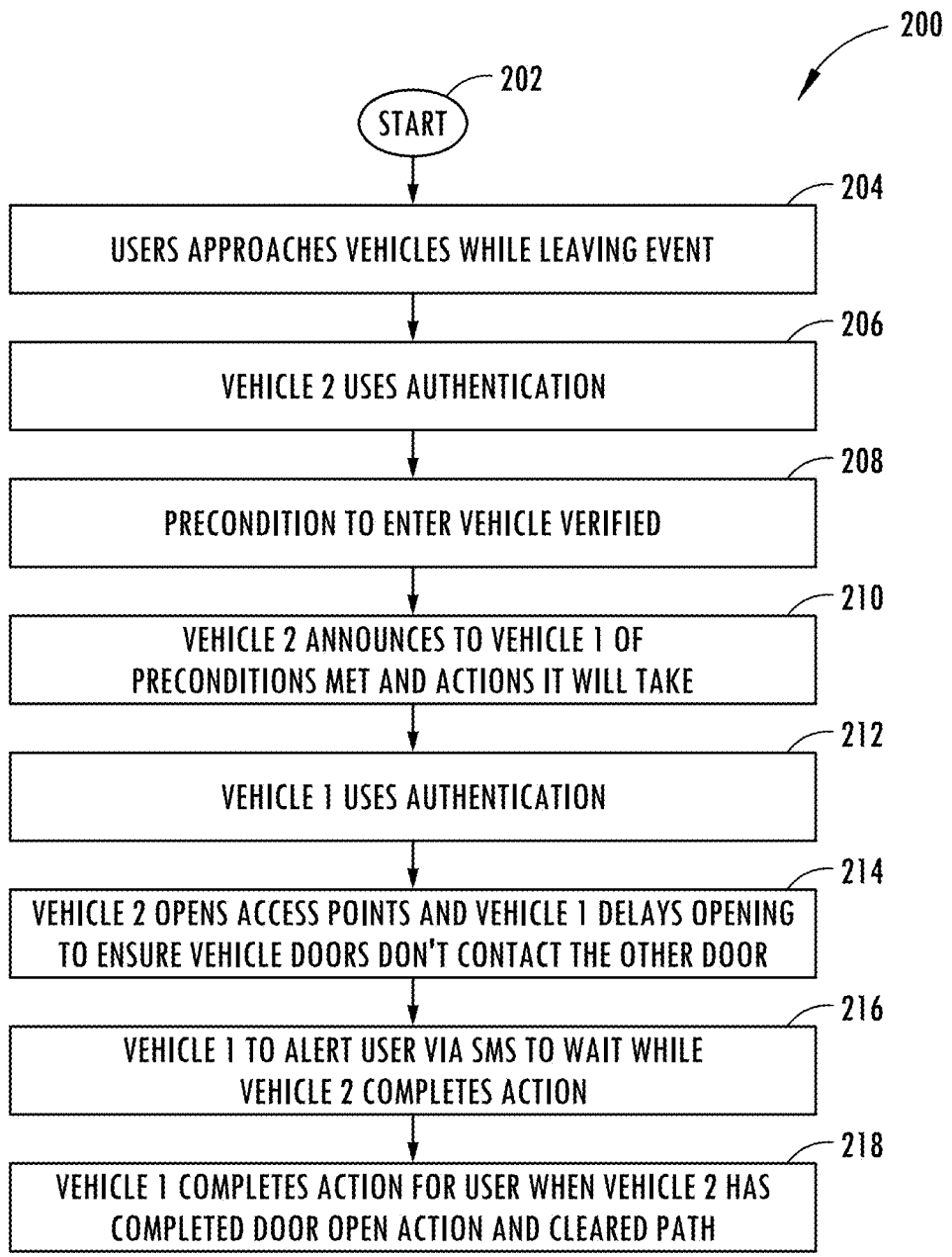
FIG. 9 is a flow diagram illustrating a routine for detecting users approaching the vehicle and controlling the vehicle doors, according to another example.

Referring to FIG. 9, routine 200 is illustrated, according to one example. Routine 200 begins at step 202 and proceeds to step 204 where users approach their vehicles while leaving an event, for example. At step 206, second vehicle 2 uses authentication to determine the intention of the second user to enter or access the corresponding second vehicle. Next, at step 208, routine 200 provides a precondition to enter the second vehicle that is verified. The second vehicle then announces to the first vehicle that the precondition is met and takes action at step 210. The first vehicle uses the authentication at step 212 and proceeds to step 214 for the second vehicle to open access points and the first vehicle to delay opening to ensure that the vehicle doors do not contact each other. Routine 200 then proceeds to step 216 where the first vehicle alerts the user via a messaging services (SMS) to wait while the second vehicle completes the action and then proceeds to step 218 where the first vehicle completes the action for the user when the second vehicle has completed the door open action and cleared the path.

Accordingly, a vehicle 10A having powered door controls is provided for controlling access to the vehicle 10A and prioritizing access given to the vehicle 10A relative to second vehicle 10B based on the location of the corresponding users. This advantageously allows for motor controlled access to the vehicle doors in a crowded driving scenario where multiple users may be approaching their vehicles at the same time by providing prioritization to door access to reduce the likelihood of contact of the doors and improve the access to the vehicle.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle having powered door access, the vehicle comprising:
   a powered door having an actuator for moving the door between closed and open positions;
   at least one sensor for sensing a first user approaching the vehicle;
   a transceiver for communicating with another vehicle; and
   a controller configured to determine a distance of the first user from the vehicle and communicating with the other vehicle which determines a distance of a second user from the other vehicle, wherein the controller is further configured to prioritize which of the vehicle and the other vehicle is granted permission to open a door based on the distance of the first user and the distance of second user.

2. The vehicle of claim 1, wherein the controller controls the actuator to open the powered door when permission is granted.

3. The vehicle of claim 1, wherein the at least one sensor comprises location determining circuitry communicating with an electronic device associated with the user.

4. The vehicle of claim 3, wherein the electronic device comprises one of a phone and/or a key fob.

5. The vehicle of claim 1, wherein the vehicle communicates with the other vehicle via the transceiver to acquire door opening data and requests.

6. The vehicle of claim 1, wherein the at least one sensor comprises at least one imaging camera.

7. The vehicle of claim 6, wherein the at least one imaging camera captures images of the first user proximate to the vehicle and the controller processes the images and determines if the first user is attempting to access the vehicle.

8. The vehicle of claim 1, wherein the controller determines a location of the first user of the vehicle and actuates the powered door to the open position when the first user approaches the vehicle and is closer than the second user relative to the other vehicle.

9. The vehicle of claim 1, wherein the controller determines a location of the first user and actuates the powered door to the open position when the first user is determined to approach the vehicle quicker than the second user of the other vehicle based on speed of the first and second users.

10. The vehicle of claim 1, wherein the actuator comprises an electric motor.

11. The vehicle of claim 1, wherein the at least one powered door comprises a passenger door that pivots about a hinge assembly.

12. The vehicle of claim 1, wherein the at least one door comprises one of a front door or a rear door.

13. A vehicle having powered door access, the vehicle comprising:
- a powered door having an actuator for moving the door between closed and open positions;
- at least one sensor for sensing a first user approaching the vehicle;
- a transceiver for communicating with another vehicle; and
- a controller configured to determine a distance of the first user from the vehicle and communicating with the other vehicle which determines a distance of a second user from the other vehicle, wherein the configured to determine which of the vehicle and the other vehicle is granted permission to open a door based on the distance of the first user and the distance of the second user, and wherein the controller controls the actuator to open the powered door when permission is granted.

14. The vehicle of claim 13, wherein the at least one sensor comprises location determining circuitry communicating with an electronic device associated with the user.

15. The vehicle of claim 13, wherein the at least one imaging camera captures images of the first user proximate to the vehicle and the controller processes the images and determines if the first user is attempting to access the vehicle.

16. The vehicle of claim 13, wherein the controller determines a location of the first user of the vehicle and actuates the powered door to the open position when the first user approaches the vehicle and is closer than the second user relative to the other vehicle.

17. The vehicle of claim 13, wherein the controller determines a location of the first user and actuates the powered door to the open position when the first user is determined to approach the vehicle quicker than the second user of the other vehicle based on speed of the first and second users.

18. A method of controlling powered doors on first and second vehicles, the method comprising the steps of:
- communicating between a first vehicle having a first powered door and actuator for moving the first powered door between closed and open positions and a second vehicle having a second powered door having a second actuator for moving the second powered door between closed and open positions;
- sensing a first user approaching the first vehicle;
- sensing a second user approaching the second vehicle;
- determining a distance of the first user from the first vehicle;
- determining a distance of the second user from the second vehicle; and
- prioritizing which of the first and second doors of the respective first and second vehicles may open based on the distance of the first user and the distance of the second user.

19. The method of claim 18 further comprising the step of controlling the first and second actuators to open one of the first and second powered doors when permission is granted.

20. The method of claim 18 further comprising the step of determining when the first user is approaching the first vehicle quicker than the second user approaching the second vehicle based on speed of the first and second users, and opening the first door of the first vehicle.

* * * * *

UNITED STATES PATENT AND TRADEMARK OFFICE
CERTIFICATE OF CORRECTION

| | | |
|---|---|---|
| PATENT NO. | : 11,898,382 B2 | Page 1 of 1 |
| APPLICATION NO. | : 17/469972 | |
| DATED | : February 13, 2024 | |
| INVENTOR(S) | : Salter et al. | |

It is certified that error appears in the above-identified patent and that said Letters Patent is hereby corrected as shown below:

In the Claims

Column 11:
Claim 13, Line 16;
"wherein the configured to determine" should be -- wherein the controller is further configured to --.

Signed and Sealed this
Ninth Day of April, 2024

Katherine Kelly Vidal
*Director of the United States Patent and Trademark Office*